US008605151B2

(12) United States Patent
Bellamy et al.

(10) Patent No.: US 8,605,151 B2
(45) Date of Patent: Dec. 10, 2013

(54) METHODS AND SYSTEMS FOR OPERATING A VIDEO SURVEILLANCE SYSTEM

(75) Inventors: Dirk Livingston Bellamy, Salem, OR (US); Nery Manuel Moreno, Costa Mesa, CA (US); Kenneth McCormack, Albany, OR (US); Kenton Arthur St. John, Albany, OR (US); Vikas Mohan Sharma, Irvine, CA (US); R. Kenin Page, Salem, OR (US); Stephen Anthony Shelton, Encinitas, CA (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 1590 days.

(21) Appl. No.: 11/859,531

(22) Filed: Sep. 21, 2007

(65) Prior Publication Data

US 2009/0079823 A1    Mar. 26, 2009

(51) Int. Cl.
*H04N 7/18* (2006.01)

(52) U.S. Cl.
USPC ........... 348/143; 348/148; 348/150; 348/159; 375/16; 375/240

(58) Field of Classification Search
USPC ............... 348/143–148, 150–159; 375/240–240.16
See application file for complete search history.

(56) References Cited

U.S. PATENT DOCUMENTS

| 4,814,869 | A | 3/1989 | Oliver, Jr. |
|---|---|---|---|
| 5,365,276 | A | 11/1994 | Imai et al. |
| 5,517,236 | A | 5/1996 | Sergeant et al. |
| 5,659,369 | A | 8/1997 | Imaiida |
| 6,741,617 | B2 | 5/2004 | Rosengren et al. |
| 6,744,865 | B2 * | 6/2004 | Lahutsky ................. 379/102.01 |
| 6,757,008 | B1 | 6/2004 | Smith |
| 7,015,945 | B1 | 3/2006 | Sullivan |
| 7,035,313 | B2 | 4/2006 | Fry |
| 7,304,662 | B1 | 12/2007 | Sullivan et al. |
| 7,375,743 | B2 * | 5/2008 | Millar et al. ................. 348/211.7 |
| 7,847,820 | B2 * | 12/2010 | Vallone et al. ................. 348/143 |
| 8,279,283 | B2 * | 10/2012 | McCormack ................. 348/159 |
| 2003/0086000 | A1 * | 5/2003 | Siemens et al. ............... 348/148 |
| 2005/0146609 | A1 * | 7/2005 | Creamer et al. ............ 348/207.1 |
| 2005/0162268 | A1 * | 7/2005 | Grindstaff et al. ............. 340/531 |
| 2005/0232352 | A1 * | 10/2005 | Siemens et al. .......... 375/240.12 |
| 2005/0275719 | A1 * | 12/2005 | Millar et al. ................. 348/143 |
| 2006/0088092 | A1 * | 4/2006 | Chen et al. ............... 375/240.01 |
| 2006/0158548 | A1 * | 7/2006 | Broemmelsiek .............. 348/373 |
| 2006/0170773 | A1 * | 8/2006 | Rye et al. ...................... 348/159 |
| 2006/0171453 | A1 * | 8/2006 | Rohlfing et al. .......... 375/240.01 |
| 2006/0268108 | A1 * | 11/2006 | Abraham ....................... 348/143 |
| 2006/0274829 | A1 * | 12/2006 | Siemens et al. .......... 375/240.01 |
| 2007/0076094 | A1 * | 4/2007 | Dickerson et al. ............ 348/143 |
| 2007/0171046 | A1 * | 7/2007 | Diem ....................... 340/539.13 |
| 2007/0182818 | A1 * | 8/2007 | Buehler ........................ 348/143 |
| 2007/0268373 | A1 * | 11/2007 | Creamer et al. ............ 348/211.3 |
| 2008/0259158 | A1 * | 10/2008 | Flint et al. ..................... 348/143 |
| 2009/0079823 | A1 * | 3/2009 | Bellamy et al. ............... 348/143 |

* cited by examiner

*Primary Examiner* — Wing F Chan
*Assistant Examiner* — Razu Miah
(74) *Attorney, Agent, or Firm* — Cantor Colburn LLP

(57) ABSTRACT

Methods and systems for a video surveillance system are provided. The system includes a plurality of network buses, a plurality of surveillance sensors, control devices, and sensor data storage devices and a keypad controller communicatively coupled to the at least one network bus. The keypad controller includes a plurality of interchangeable control modules communicatively coupled to said keypad controller that matingly engage a complementary portion of said keypad controller. The keypad controller further includes a processor configured to decode codec independent video streams, said processor further comprising a module configured to receive and transmit streaming video data to a network, a synchronous memory interface, and a plurality of universal asynchronous receiver/transmitter (UARTs). The keypad controller also includes a universal serial bus (USB) interface.

21 Claims, 7 Drawing Sheets

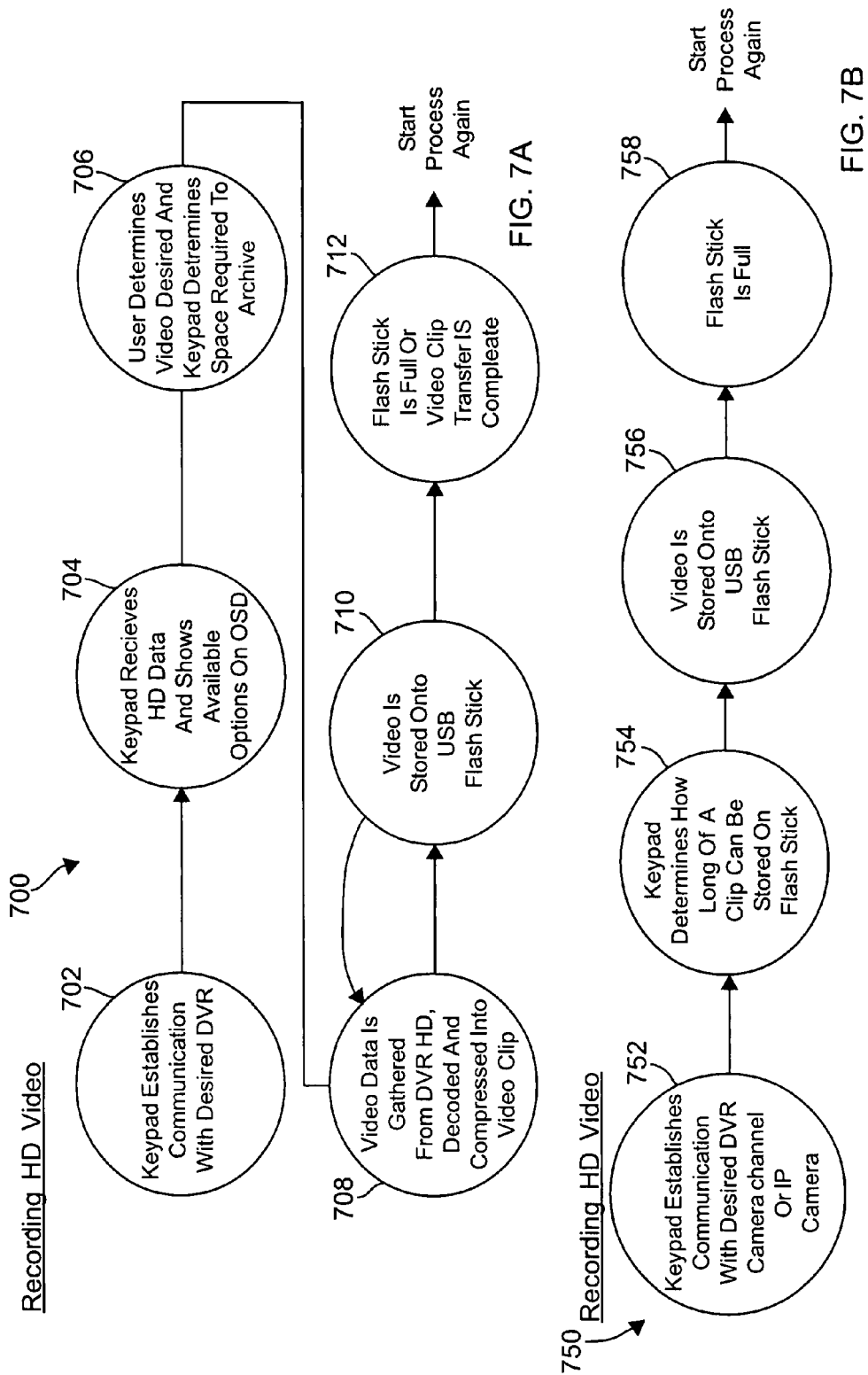

METHODS AND SYSTEMS FOR OPERATING A VIDEO SURVEILLANCE SYSTEM

BACKGROUND OF THE INVENTION

This invention relates generally to video surveillance systems and, more particularly, to operating a video surveillance system that includes a plurality of network having different protocols.

At least some known video surveillance systems include a keyboard for generating control signals based on a user input to control switches positioned on the keyboard and a display monitor for displaying selected images and/or sequences of images to the user. The keyboard generally interfaces with a processing unit and/or controller that can perform tasks and manipulate video data from a network of interconnected components. However, requiring a separate keyboard and a plurality of processing units and/or controllers to provide functionality for the system increases the system complexity and expense.

BRIEF DESCRIPTION OF THE INVENTION

In one embodiment, a video surveillance system includes a plurality of network buses including at least one serial data-based bus and at least one digital bus, a plurality of surveillance sensors, control devices, and sensor data storage devices communicatively coupled to at least one network bus, and a keypad controller communicatively coupled to the at least one serial data-based bus and the at least one internet protocol (IP) bus. The keypad controller including a plurality of interchangeable control modules communicatively coupled to the keypad controller, the control modules matingly engage a complementary portion of the keypad controller. The keypad controller further including a processor configured to decode codec independent video streams. The processor further includes a module configured to receive and transmit streaming video data to a network, a synchronous memory interface configured to communicate with a memory, and a plurality of universal asynchronous receiver/transmitter (UARTs) configured to communicate remote control commands using respective serial data based networks, and a universal serial bus (USB) interface configured to receive program updates for the processor and send streaming video and audio data to a storage device communicatively coupled to the USB interface.

In another embodiment, a method of operating a video surveillance system that includes a keypad controller including a video processor. The method includes receiving analog video signals from a video surveillance sensor and encoding the received analog video signals into a digital format video to be used by the video processor. The method also includes receiving codec independent digital format video signals from an IP-based network, decoding the digital format video signals by the video processor using a codec dependent component of the digital format video signals, and processing the digital format video signals by the video processor.

In yet another embodiment, a computer implemented method of operating a video surveillance system is provided The system includes a network, a keypad controller communicatively coupled to the network wherein the keypad controller includes a video processor and a universal serial bus (USB) interface communicatively coupled to the video processor. The USB interface is configured to communicatively couple to a NAND flash architecture device. The method includes establishing communications between the keypad controller and a video data storage device through the network, selecting at least a portion of the stored video data for download, determining an amount of memory space required to store the selected video data, decoding the selected video data to a selected format, and transmitting the decoded video data to the NAND flash architecture device.

BRIEF DESCRIPTION OF THE DRAWINGS

FIGS. 7A and 7B are flow charts of exemplary methods of recording video to a flash memory from a storage source and a live source respectively that may be used with the video surveillance system shown in FIG. 1.

DETAILED DESCRIPTION OF THE INVENTION

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to a preferred embodiment, namely, a process of controlling a video surveillance system. However, it is contemplated that this disclosure has general application to controlling remote components from a single processing and control keypad in general and particularly to acquiring, processing, and storing data and controlling sensory systems from a remote location.

Figure 1:
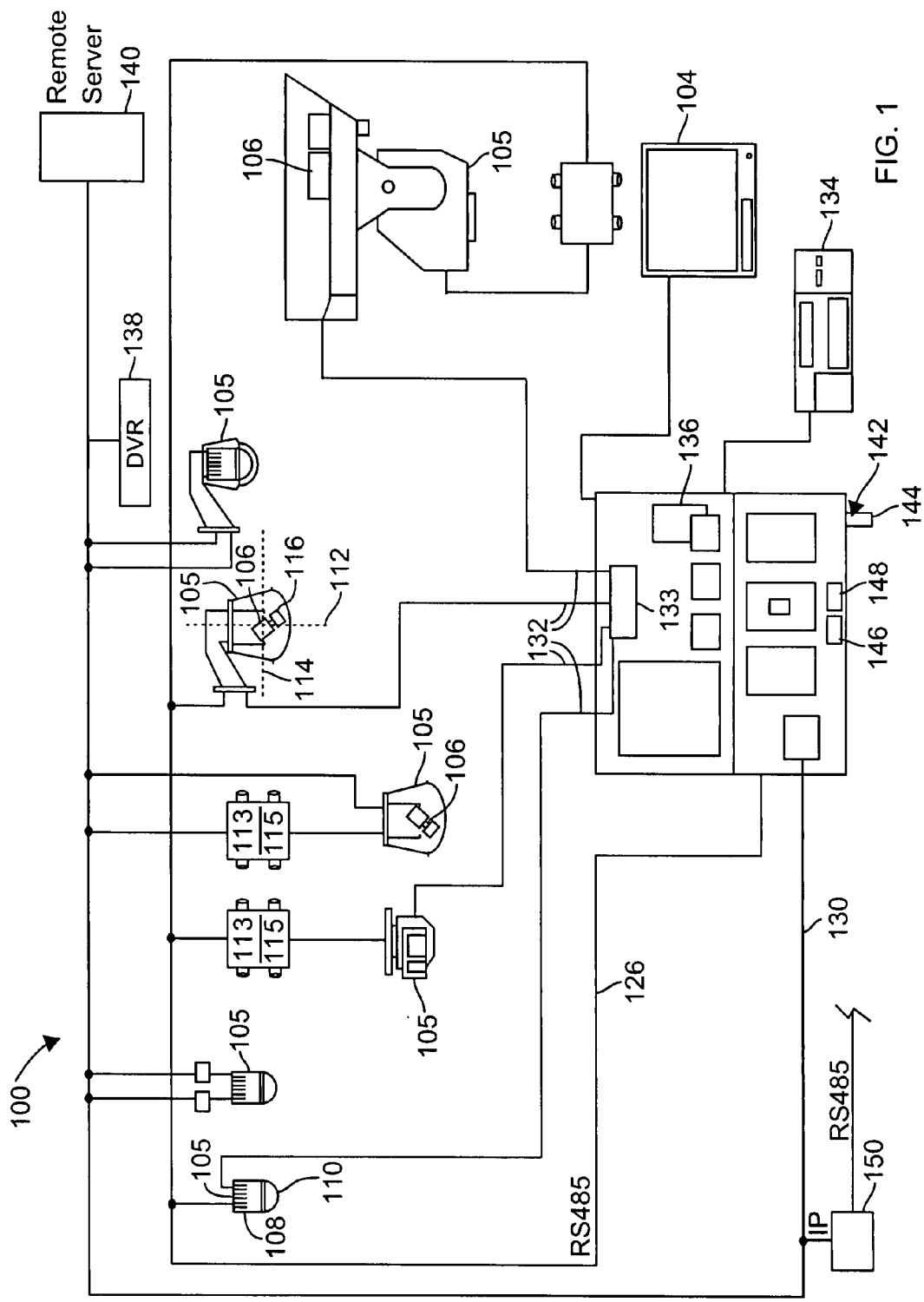
FIG. 1 is a schematic view of an exemplary video surveillance system in accordance with an embodiment of the present invention.

FIG. 1 is a schematic view of an exemplary video surveillance system 100 in accordance with an embodiment of the present invention. Video surveillance system 100 includes a controller keypad 102, one or more display monitors 104, and typically plurality of pan, tilt, and zoom (PTZ) assemblies 105. Typically, a camera 106 is housed in an enclosure 108 having a dome 110 for protecting camera 106 from the environment where camera 106 is located. In one embodiment, dome 110 is tinted to allow camera 106 to acquire images of the environment outside of enclosure 108 and simultaneously prevent individuals in the environment being observed by camera 106 from determining the orientation of camera 106. In various alternative embodiments, dome 110 is not tinted. In the exemplary embodiment, using pan, tilt, and zoom (PTZ) assemblies 105, camera 106 includes capabilities to pan about a vertical axis 112, tilt about a horizontal axis 114, and control a lens assembly 116 to cause camera 106 to zoom. For example, PTZ assembly 105 includes a pan motor and encoder 113 and tilt motor and encoder 115. The encoders determine an angular position of the pan and tilt motor and generate position signals that are used with a zoom setting to determine an area in the field of view. Signals representing commands to control such capabilities are transmitted from controller keypad 102 through a control data line 126, which may be an RS485, RS422, or other data line. Additionally, PTZ assemblies 105 that are IP ready may be controlled by controller keypad 102 through an Ethernet, WAN, Internet, or other network 130.

Controller keypad 102 includes embedded image capture capabilities which permit video images or extracted information to be compressed, stored, or transmitted over communication networks or digital data link. Image data signals are transmitted from cameras 106 to controller keypad 102 through respective video data lines 132. Video data lines 132 communicate with an analog video decoder 133, which is configured to receive analog video signals in baseband analog video formats (NTSC/PAL/SECAM) and digitizes and decodes the received signals into digital video for further processing by a processor 146. Additionally, image data signals from cameras 106 that are IP ready may be received by controller keypad 102 through IP network 130. Images, audio, data, and/or video sequences may be stored at a local digital video recorder (DVR) 134 communicatively coupled to controller keypad 102 or a DVR 136 incorporated within controller keypad 102. In the exemplary embodiment, processor 146 comprises a video processor that performs real-time image capture processing, compression and decompression, color space conversion and real-time display, and data packetization for data communication over IP network 130.

DVR 134 stores multiple camera inputs and may be implemented as a standalone device, a PC card, or as a software/firmware component in controller keypad 102. DVR 134 includes a video digital signal processor (DSP) that is used to compress the inputs in a plurality of standard and non-standard video formats. Additionally, the DSP includes intelligent image analysis functions and various types of networking protocol support.

Additionally, controller keypad 102 can access images, audio, data, and/or video sequences stored on a remote DVR 138 and/or stored on a server 140 located remotely from controller keypad 102. Controller keypad 102 includes a Universal Serial Bus (USB) port 142 that is configured to communicatively couple to a portable USB flash drive 144. Controller keypad 102 is configured to transfer images, audio, data, and/or video sequences stored on DVR 134, DVR 138, server 140, and/or live images, audio, data, and/or video sequences in real-time to flash drive 144.

In the exemplary embodiment, controller keypad 102 includes a processor 146 receives programmed instructions, from software, firmware, and data from memory 148 and performs various operations using the data and instructions. Processor 146 may include an arithmetic logic unit (ALU) that performs arithmetic and logical operations and a control unit that extracts instructions from memory 148 and decodes and executes them, calling on the ALU when necessary. Memory 148 generally includes a random-access memory (RAM) and a read-only memory (ROM), however, there may be other types of memory such as programmable read-only memory (PROM), erasable programmable read-only memory (EPROM) and electrically erasable programmable read-only memory (EEPROM). In addition, memory 148 may include an operating system, which executes on processor 146. The operating system performs advance computational, image processing, data conversion, and communications tasks that include recognizing input, sending output to output devices, keeping track of files and directories and controlling various peripheral devices through serial and network protocol data buses.

The term processor, as used herein, refers to central processing units, microprocessors, microcontrollers, reduced instruction set circuits (RISC), application specific integrated circuits (ASIC), logic circuits, and any other circuit or processor capable of executing the functions described herein. Memory 148 may include storage locations for the preset macro instructions that may be accessible using one of a plurality of preset switches (not shown) located on controller keypad 102.

As used herein, the terms "software" and "firmware" are interchangeable, and include any computer program stored in memory for execution by processor 146, including RAM memory, ROM memory, EPROM memory, EEPROM memory, and non-volatile RAM (NVRAM) memory. The above memory types are exemplary only, and are thus not limiting as to the types of memory usable for storage of a computer program. In various embodiments, processor 146 and memory 148 are located in controller keypad 102 performing the functions described herein.

System 100 includes an IP pass-through device 150 that is configured to essentially extend an RS485 bus over Ethernet. Device 150 enables control of devices, such as domes, on a remote RS485 bus. In the exemplary embodiment, a user identifies an IP for a DVR or streaming device and transmits Ethernet packets that hold the destination address for the device that it wants to control. IP pass-through device 150 decodes the Ethernet packet into an RS485 message and passes the RS485 message over the RS485 bus.

Figure 2:
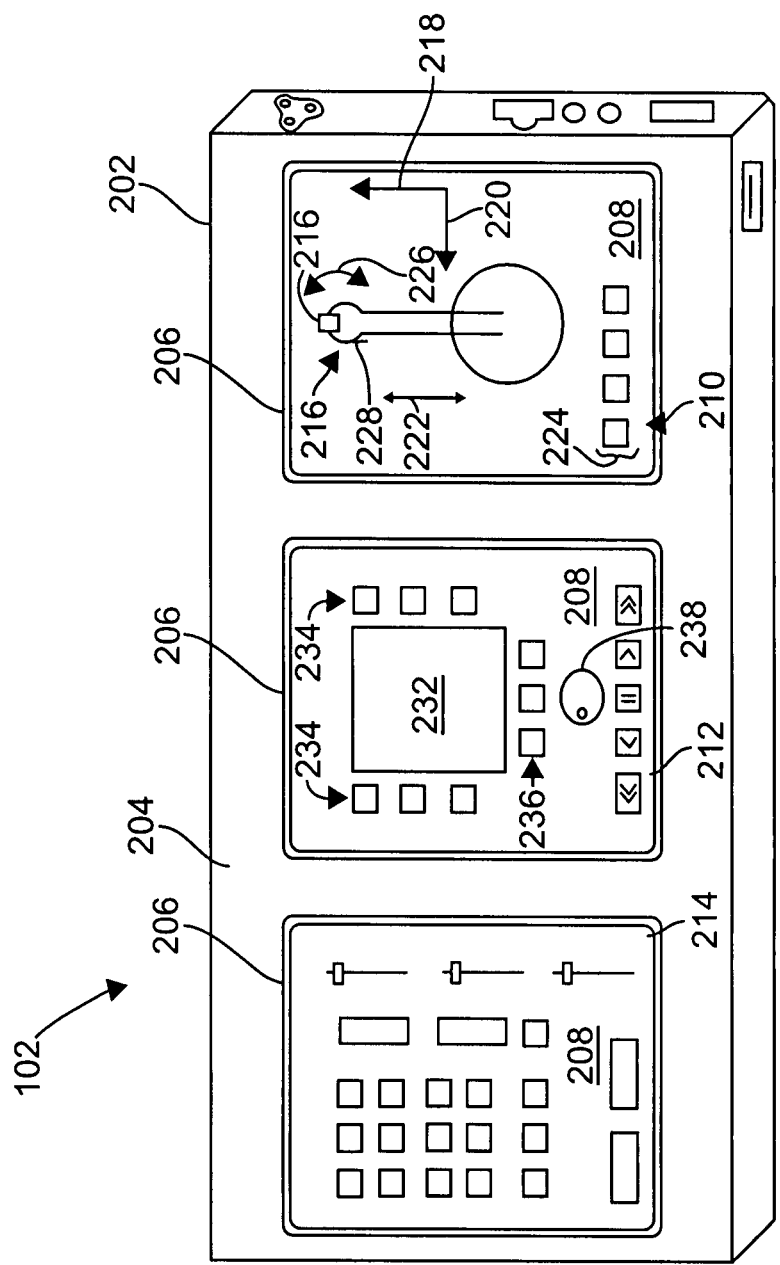
FIG. 2 is a perspective view of the controller keypad shown in FIG. 1 in accordance with an embodiment of the present invention.

FIG. 2 is a perspective view of controller keypad 102 (shown in FIG. 1) in accordance with an embodiment of the present invention. In the exemplary embodiment, controller keypad 102 includes a housing 202 including a housing face 204. Housing face includes a plurality of module apertures 206 for receiving one of a plurality of interchangeable keypad control modules 208. Control modules 208 and apertures 206 are configured to mate complementarily such that any one of the plurality of modules 208 may be operable in any of apertures 206. In an alternative embodiment, only predetermined ones of the modules 208 are matable to predetermined ones of the apertures 206. Modules 208 are configured to physically mate with a respective aperture 208 using a shape of module 208 and a shape of the respective aperture 206. For example, in the exemplary embodiment, each of modules 208 is illustrated as having a square shape, which is complementarily matable to each respective aperture 206. In various other embodiments, modules 208 and apertures are different shapes. For example, modules 208 and apertures 206 may be circular such that any of modules 208 may be rotated in a respective aperture 206 to provide a more comfortable position for operation by a user. In another example, modules 208 may include a one or more tabs configured to mate with at least one slot along the inner periphery of aperture 206. In another alternative embodiment, modules 208 may include a serrated edge (not shown) to mate with a serrated inner circumference of a respective aperture 206 to permit rotation of module 208 in discreet angular increments. In other exemplary embodiments, the tabs and slots are positioned on the other of module 208 and aperture 206. Modules 208 and apertures 206 are communicatively couplable using similar connection systems (not shown) that facilitate plugging module 208 into aperture 206 while still permitting modules 208 to be rotated with respect to aperture 206. Such connection systems may include direct electrical connection between module 208 and aperture 206 and/or other communicative connection such as but not limited to infrared and a wireless short-range radio frequency personal area network (PAN) such as but not limited to, Bluetooth. In one embodiment, a USB connection is used such that the modules are "hot swappable." In another embodiment, a local bus using two headers and a ribbon cable are utilized wherein the ribbon cable may be wide enough to accommodate a one to one pin mapping for each module 208. Processor 146 determines which module 208 is associated with each aperture 206 by for example, completing a logic HIGH/LOW circuit for a known input pin.

In the exemplary embodiment, modules 208 include a joystick module 210, a display module 212, and a numeric keypad module 214. Joystick module 210 includes an X-Y-Z control joystick 216 that is used to generate pan and tilt commands for a selected camera. Joystick includes movements in an X-direction 218, a Y-direction 220, and a Z-direction 222. A plurality of switches 224 are used to control a zoom, a focus, and an iris of the camera lens assembly. In an alternative embodiment, joystick 216 includes a twist actuation 226 that is used to control the zoom of the camera lens assembly. Joystick 216 may also incorporate triggers 228 and/or buttons 230 to facilitate operating various controls associated with system 100.

Display module 212 includes a screen 232 that may be used to display selected video images from a selected camera or cameras using split screen or other image display techniques, to display a status of video surveillance system 100 or may be used to display parameters associated with a selected camera.

For example, screen 232 may be divided into a plurality of screen areas, each screen area capable of displaying a selected one of a plurality of received video streams simultaneously with other selected video streams displayed in others of the plurality of screen areas. One of the plurality of video streams may be selected as a primary video stream and the primary video stream displayed on the display screen for example in a full screen mode. Simultaneously, others of the remaining plurality of video streams may be displayed on the display screen in a manner that is subordinate to the primary video stream for example, as a live display thumbnail, an icon, or a reduced size video stream. In an embodiment, the primary video stream may be automatically cycled through all the selected plurality of video streams such that each video stream is displayed as the primary video stream in turn with the other video streams. In another embodiment the subordinated video streams may be displayed in a sidebar of the display screen or a running strip along an edge of the display screen similar to a stock ticker display.

If the subordinated video streams are displayed in a sidebar, they are scaled by the keypad controller and displayed along an edge of the display screen. The primary video stream may be scaled such that no portion of the primary video stream is occluded by the placement of the subordinated video streams in the sidebar. Quick key macros from the keypad permit any one of the subordinated video streams to switch locations with the primary.

If the subordinated video streams are displayed in a running strip, they are reduced in size and cycle across the bottom/top/side of the display screen. The subordinated video streams move across the allotted space similar to the "stock-ticker." The subordinated video streams cycle through the display screen. The running strip allows more video streams to be displayed on the display screen than physically possible by sampling the video streams. The user can configure the run rate the number of video streams cycling through the display. Macro keys on the keypad controller may be used to permit quick selection of the cycling video streams to be moved to be the primary video stream.

The plurality of video streams are selectable based on criteria including but not limited to a proximity of the cameras generating the video streams to a common location or path through an area, a logical selection based on a user input or a predetermined selection, and an activity fashion. A macro entered into the keypad controller or other recording of the selected video streams may be used to select the video streams associated with each criteria and to store the selection in the keypad controller for future reference. The proximity may be defined by a geographic grouping such as displaying video streams for all cameras associated with a parking lot. The logical criteria may be defined for all cameras associated with entry/exit locations and an activity mode of selection may use analytic meta data from the cameras or video stream to determine activity in the camera's field of view. Primary video stream may be configured to display the video stream representing the most activity and the remaining video streams may be displayed by a ranking of the next most activity in the video stream to the least activity occurring in the video stream.

Display module 212 further includes a plurality of soft and/or preset switches 234 that may be programmed to execute macros that automatically control the actions of any of cameras and/or lens assemblies associated with a respective camera. A plurality of buttons 236 may be used, for example, for predetermined control functions and/or user-defined functions, for example, a camera selection in a multi-camera video surveillance system. Display module 212 further includes a jog-shuttle switch 238. for controlling playback of video image streams that have been stored on the hard drive or drives within keypad controller 102. Jog-shuttle switch 238 is configured to permit a user to control such playback features as forward playback, reverse playback and pause (still image) playback. In the exemplary embodiment, at least two forward and reverse playback rates are provided, corresponding to different amounts by which the jog-shuttle switch is rotated clockwise or counterclockwise. Jog-shuttle switch 238 automatically returns to a "neutral" position after being released by the user and playback or rewind continues at the rate selected by the latest manipulation of Jog-shuttle switch 238. In the exemplary embodiment, jog-shuttle switch 238 is used to scroll through large menus.

Numeric keypad module 214 facilitates entering numbers and values into system 100. In an alternative embodiment, numeric keypad module 214 may include an alpha or alpha-numeric keypad (not shown) for entering textual information that may appear overlaid on video images or messages.

Figure 3:
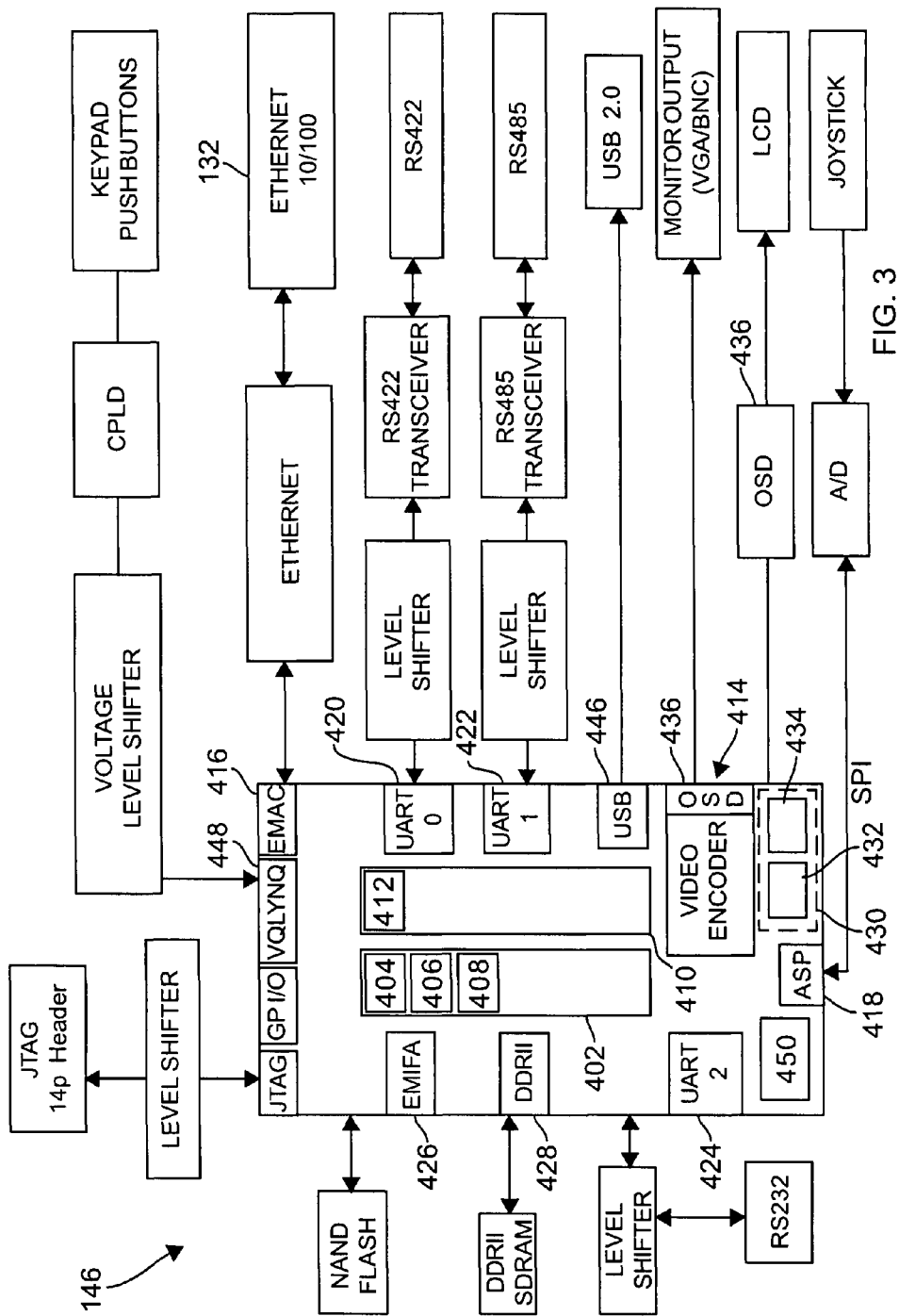
FIG. 3 is a block diagram of an exemplary processor that may be used with the system shown in FIG. 1.

FIG. 3 is a block diagram of an exemplary processor 146 that may be used with system 100 (shown in FIG. 1). In the exemplary embodiment, processor 146 comprises a DSP-based digital media processor. Processor 146 includes on-chip video polls for connection to video devices and is configured to handle both video and audio encode and decode for IP-based video surveillance applications. Processor 146 also includes on-chip PCI or EMAC support.

Processor 146 includes intelligent video analysis algorithms based on artificial intelligence called "computer vision," which processes all objects in a camera's field of view against pre-programmed rules for object recognition, motion detection and video content analysis. For example, when an object violates a rule, for example, a person crosses a tripwire, or an object disappears from an area of interest, the software generates an alert which can be transmitted locally, through the network, or wirelessly using cellular or radio systems.

Processor 146 is configured to interface with IP video nodes, video servers and video matrixes that handle multiple camera inputs, digitize, compress and stream digital media content over an IP network such as a LAN, intranet or Internet such that an analog video system may be used with a network video system wherein a plurality of users are able to view live images using web browsers or application software on any local or remote computer on a network. User configuration and control can also be implemented remotely over the network such that authorized viewers from different locations may simultaneously access images from the same analog camera(s), as well as network cameras.

In the exemplary embodiment, processor 146 includes a dual-core architecture including DSP and Reduced Instruction Set Computer (RISC) technologies. A first core 402 comprises a 32-bit RISC processor core that performs 32-bit or 16-bit instructions and processes 32-bit, 16-bit, or 8-bit data. First core 402 uses pipelining so that all parts of the processor and memory system can operate continuously. First core 402 includes a coprocessor 404, a protection module 406, and a data and program Memory Management Unit 408 (MMU) with table look-aside buffers. Although processor 146 is described as having a particular architecture other processor architectures capable of performing the functions described herein may be used as the description is exemplary and should not be taken as limiting the architecture of processor 146. For example, processor 146 may include higher numbers of cores and may comprise loosely coupled processors such as a multi-core DSP with a fast processor.

In the exemplary embodiment, a second core 410 includes a fixed-point DSP platform based on an enhanced version of the second-generation high-performance, advanced very-long-instruction-word (VLIW) architecture. A second core processor 412 includes 64 general-purpose registers of 32-bit word length and eight highly independent functional units including, for example, two multipliers for a 32-bit result and six arithmetic logic units (ALUs). The eight functional units include instructions to accelerate the performance in video and imaging applications.

Processor 146 includes a configurable video port 414, a 10/100 Mb/s Ethernet Media Access Control (EMAC) with a Management Data Input/Output (MDIO) module 416, an audio serial port (ASP) 418, a universal asynchronous receiver/transmitter (UART) for each of RS422, RS485, and RS232 support, respectively 420, 422, and 424, and an asynchronous external memory interface (EMIFA) 426 for slower memories/peripherals, and a higher speed synchronous memory interface 428 to for example, a "multi-channel" memory such as a dual-data-rate (DDR2) memory or DDR3 memory for high-bandwidth memory storage of video data. EMAC 416 permits network connectivity for streaming surveillance applications. ASP 418 provides an interface to audio codecs. UARTs 420, 422, and 424 translate data between parallel and serial interfaces to permit remote control capabilities and pan/tilt/zoom control in networked video surveillance applications by converting bytes of data to and from asynchronous start-stop bit streams represented as binary electrical impulses.

Processor 146 also includes a Video Processing Subsystem 430 (VPSS) with two configurable video/imaging peripherals, a Video Processing Front-end 432 (VPFE) input used for video capture and a Video Processing Back-End 434 (VPBE) output with imaging co-processor (VICP) used for display. VPSS 430 includes a glueless CCD/CMOS video interface and video-processing functions, such as but not limited to camera control and image scaling.

The VPFE 432 is comprised of a CCD Controller (CCDC), a Preview Engine (Previewer), Histogram Module, Auto-Exposure/White Balance/Focus Module (H3A), and Resizer. The CCDC is capable of interfacing to common video decoders, CMOS sensors, and Charge Coupled Devices (CCDs). The Previewer is a real-time image processing engine that receives raw imager data from a CMOS sensor or CCD and converts it for further processing. The Histogram and H3A modules provide statistical information on the raw color data for use by processor 146. The Resizer accepts image data for separate horizontal and vertical resizing from ¼× to 4× in increments of 256/N, where N is between 64 and 1024.

VPBE 434 includes an On-Screen Display Engine 436 (OSD) and a Video Encoder 438 (VENC). The OSD engine is capable of handling a plurality of separate video windows and a plurality of separate OSD windows. In an alternative embodiment, a plurality of video windows, OSD windows, and attribute windows are supported allowing a plurality of different levels of alpha blending. VENC 438 includes a plurality of analog DACs that provide for composite NTSC/PAL video, S-Video, and/or component video output. VENC 438 also digital output to interface to RGB888 devices and the digital output is capable of 8/16-bit BT.656 output and/or CCIR.601 with separate horizontal and vertical syncs.

Ethernet Media Access Controller 416 (EMAC) includes an interface between second core processor 410 and network 132. EMAC 416 supports 10Base-T and 100Base-TX, 10 Mbits/second (Mbps) and 100 Mbps in either half- or full-duplex mode, with hardware flow control and quality of service (QOS) support.

Ports such as a Host Port Interface (HPI) 440, an inter-integrated circuit (I2C) Bus interface 442, a Serial Port Interface SPI 444, USB2.0 446, and VLYNQ 448 ports permit processor 146 to control peripheral devices and/or communicate with host processors. Processor 146 also includes a Video/Imaging, Coprocessor 450 (VICP) to offload many video and imaging processing tasks from first core 402. VICP 450 includes codecs, such as SVC, H.264, WMV9, MPEG1, MPEG2, and MPEG4 as well as support for enabling future algorithms to be added through software changes.

Figure 4:
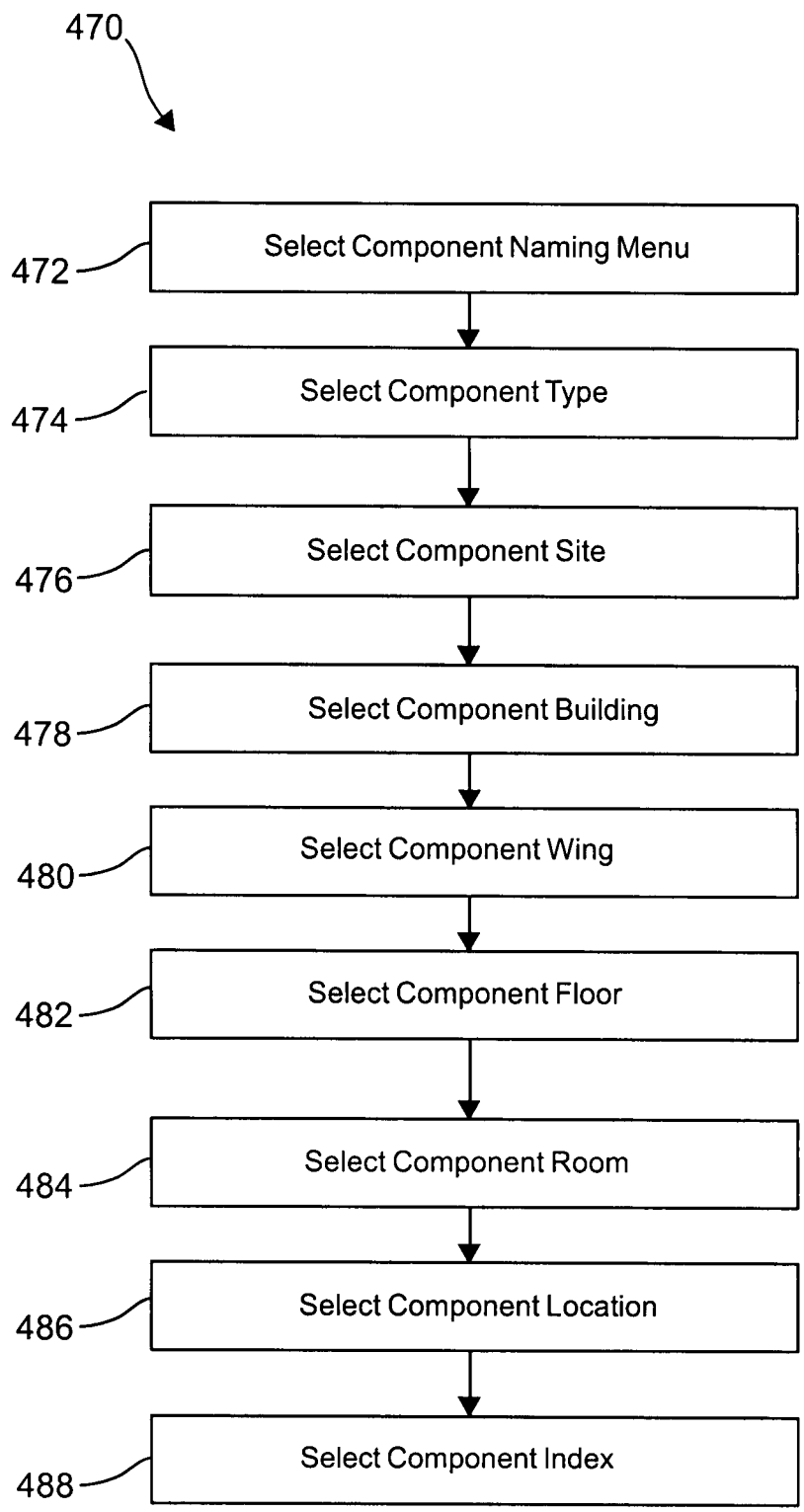
FIG. 4 is a flow chart of an exemplar), method of aliasing camera nomenclature that may be used with the video surveillance system shown in FIG. 1.

FIG. 4 is a flow chart of an exemplary method 470 of aliasing camera nomenclature that may be used with video surveillance system 100 (shown in FIG. 1). In a large installation, a user may need to remember camera or other system component locations in multiple sites and/or buildings where the components are addressed by a reference number alone. To facilitate the operation of system 100, using method 470 a user may populate a table, or series of tables, to permit the user to then select components by a descriptive name selected from within a nested menu structure. In the exemplary embodiment, method 470 includes selecting 472 a component naming menu from a menu listing presented on display 232 (shown in FIG. 2). Method 470 further includes, from the component naming menu, selecting 474 a component type from a listing of possible component types displayed on display 232, for example, an analog camera, an IP camera, or other component to be assigned an text name to represent the component. After the component type is selected 474, a new listing of choices is displayed and the user is prompted to select one of the choices for, for example, selecting 476 a component site. Selection of a naming continues in like manner wherein method 470 includes selecting 478 a component building, selecting 480 a component wing of the building or other defined zone of the building, selecting 482 a floor level of the building where the component is located, selecting 484 a room identifier, such as a name or a number, selecting 486 a component location in the room, and selecting 488 a component index, such as a sequential number for a plurality of components located in the same area. Such a naming convention and method of assigning descriptive names permits users, particularly a relatively new user to quickly access infrequently used components. A user with administrator permissions could control the descriptive name selection choices to facilitate consistency in the naming convention.

Figure 5:
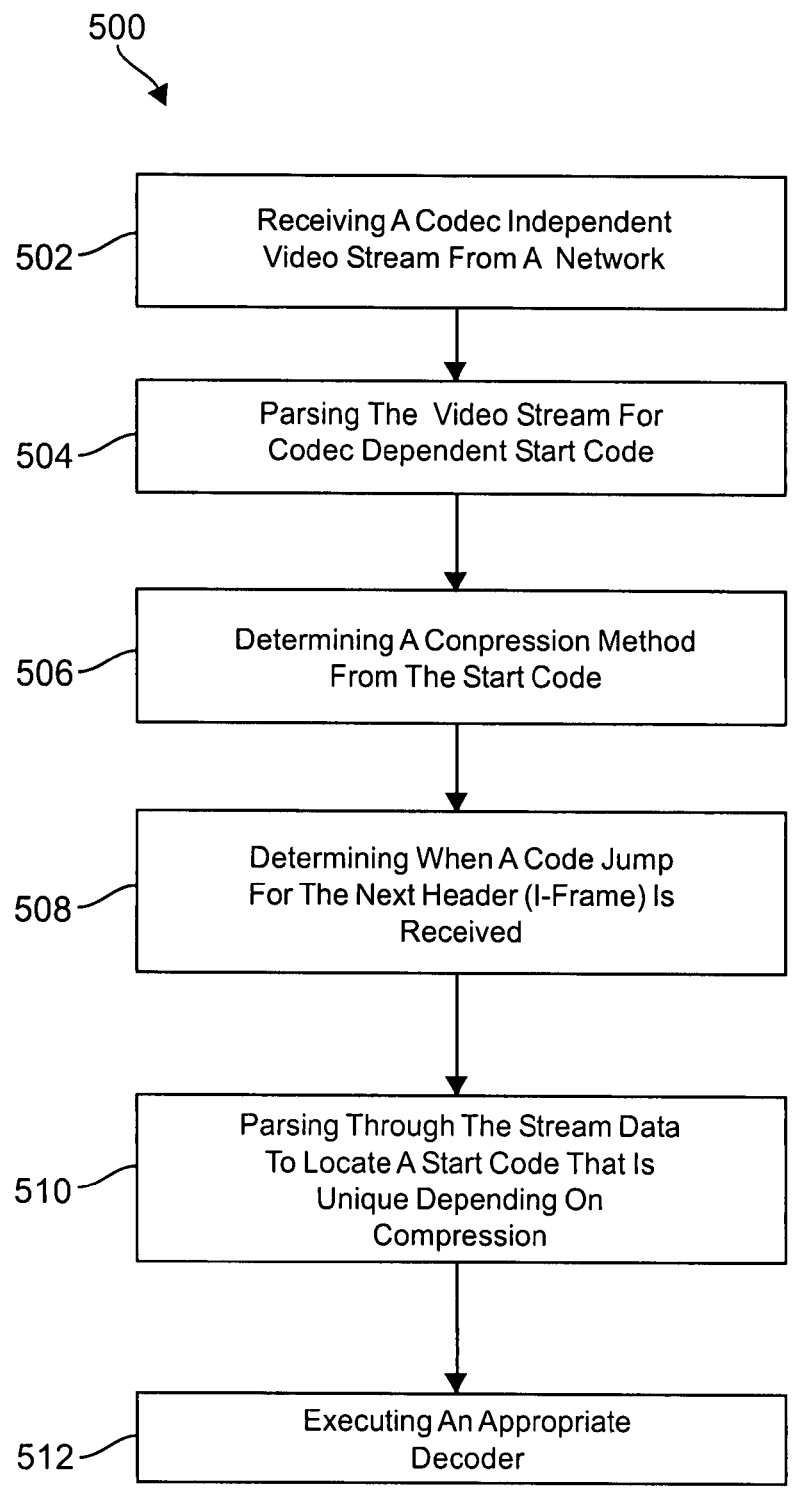
FIG. 5 is a flow chart of an exemplary codec independent method of decoding a video stream that may be used with the video surveillance system shown in FIG. 1.

FIG. 5 is a flow chart of an exemplary codec independent method 500 of decoding a video stream that may be used with video surveillance system 100 (shown in FIG. 1). In the exemplary embodiment, method 500 is executed on-board keypad controller 102 and includes receiving 502 a codec independent video stream from a network. In the exemplary embodiment, the video stream is transmitted from a DVR, streaming device, or IP camera using a network. Method 500 includes parsing 504 the Ethernet stream for codec dependent start code. Codecs typically include a certain start code, which can be used to identify the type of compression was used in the incoming steam and is used to determine 506 a decoder to implement on the incoming stream. If the start code indicates an MPEG compression, method 500 determines 508 when a code jump for the next header (I-frame) is received. Method 500 then parses 510 through the Ethernet stream data to locate a start code that is unique depending on compression. Similarly, for non-MPEG based compression, such as JPEG2000 and Wavelet, an I-frame is determined from the start code and code jump and an appropriate decoder is executed.

Figure 6:
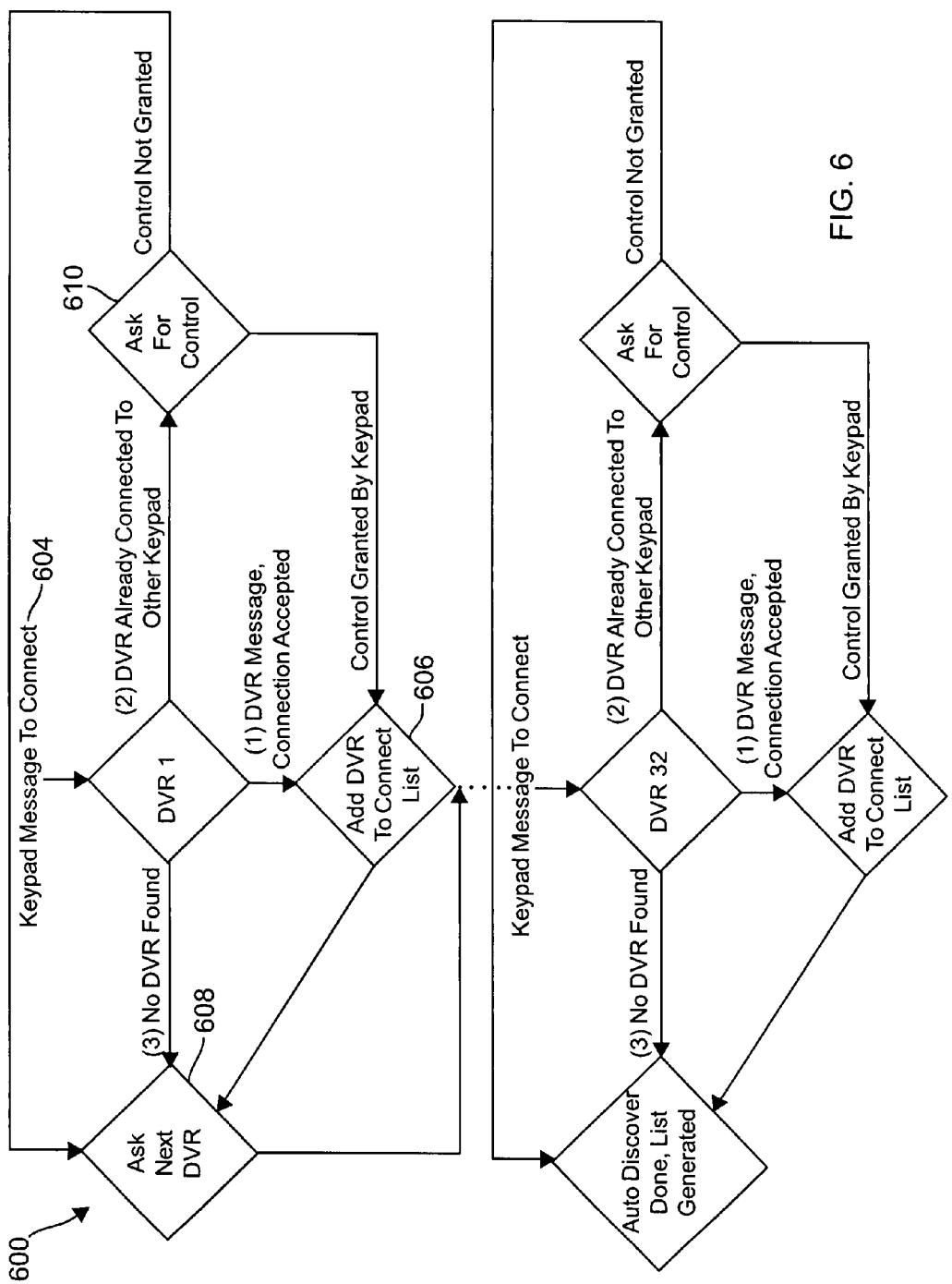
FIG. 6 is a flow chart of an exemplary method of analog autodiscover that may be used with the video surveillance system shown in FIG. 1.

FIG. 6 is a flow chart of an exemplary method 600 of analog autodiscover that may be used with video surveillance system 100 (shown in FIG. 1). In the exemplary embodiment, keypad controller 102 automatically identifies DVRs communicatively coupled to system 100. Method 600 includes receiving from a single pushbutton on keypad controller 102, a message to initiate autodiscover to establish communications with any DVRs communicatively coupled to system 100. Method 600 also includes transmitting 604 a connect message to a first DVR address. If the first DVR responds, the first DVR is added 606 to a connect list and a second DVR is sent 608 a message to connect. If the first DVR did not respond, a message to connect is sent 608 to the second DVR without adding the first DVR to the connect list. If the first DVR is already being controlled by a second keypad controller 102, the first keypad controller 102 requests 610 control of the first DVR, if the second keypad controller 102 relinquishes control of the first DVR to the first keypad controller 102, the first DVR is added 606 to the connect list and a message to connect is sent to the second DVR. If the second keypad controller 102 does not relinquish control, a message to connect is sent 608 to the second DVR without adding the first DVR to the connect list.

Method 600 cycles through all DVRs in a similar manner and completes the handshaking to complete a connection. If another keypad is already connected to a specific DVR, then the auto discover feature halts and goes though the request process with the connected keypad. Once the request has been negotiated, the auto discovery feature re-starts from the halted location. This continues until all 32 DVRs have been requested to connect.

FIGS. 7A and 7B are flow charts of exemplary methods 700 and 750 of recording video to a flash memory from a storage source and a live source respectively that may be used with video surveillance system 100 (shown in FIG. 1). In the exemplary embodiment, there are two possible types of video clips that will be recorded onto a flash stick from USB interface 446. The first is playback video that is stored in a DVR hard drive (HD). The second is live video from a DVR camera channel, a streaming unit, or an IP camera. Method 700 includes establishing 702 communications between keypad controller 102 and a desired DVR. Method 700 also includes receiving 704 by the keypad controller 102 of HD data and displaying available options on OSD. A user determines 706 the video desired and keypad controller 102 determines an amount of memory space required to store the archive. Video Data is acquired 708 from DVR HD, decoded and compressed into a video clip. Video is stored 710 onto USB Flash memory device 144 communicatively coupled to interface 446. Method 700 terminates 712 when USB Flash memory device 144 is full or video clip transfer is complete.

Method 750 includes establishing 752 communications between a desired DVR camera channel or IP Camera and keypad controller 102. Keypad controller 102 determines 754 a length of video clip can be stored on USB Flash memory device 144. Streaming video is captured live and is stored 756 onto USB Flash memory device 144. Method 750 terminates 758 when USB Flash memory device 144 is full or video clip transfer is complete.

The above-described embodiments of a video surveillance system provide a cost-effective and reliable means for operating a video surveillance system from a single control and processing controller that is capable of autodiscovering components coupled to the system at local and remote locations and to interface with legacy components as well and IP addressable components over a network.

Exemplary embodiments of video surveillance systems and apparatus are described above in detail. The video surveillance system components illustrated are not limited to the specific embodiments described herein, but rather, components of each system may be utilized independently and separately from other components described herein. For example, the video surveillance system components described above may also be used in combination with different video surveillance system components.

As will be appreciated and based on the foregoing specification, the above-described embodiments of the disclosure may be implemented using computer programming or engineering techniques including computer software, firmware, hardware or any combination or subset thereof, wherein the technical effect of the executable code is to facilitate security management and control processes for security systems. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

While the invention has been described in terms of various specific embodiments, those skilled in the art will recognize that the invention can be practiced with modification within the spirit and scope of the claims.

What is claimed is:
1. A video surveillance system comprising:
is network bus;
a plurality of surveillance sensors, control devices, and sensor data storage devices communicatively-coupled to said network bus;
a keypad controller communicatively coupled to said network bus, said keypad controller comprising:
a housing that includes a plurality of apertures, wherein each aperture of the plurality of apertures forms a geometric shape; wherein the geometric shape is unrelated to electrical coupling with the keypad controller;

a plurality of removable and interchangeable control modules electrically coupled to said keypad controller, each of said control modules having a geometric shape configured to physically mate with a geometrically complementary aperture of the plurality of apertures of said keypad controller;

a processor configured to decode codec independent-video streams, said processor further comprising a module configured to receive and transmit streaming video data to said network bus, a synchronous memory interface configured to communicate with a memory, and a plurality of universal asynchronous receiver/transmitter (UARTs) configured to communicate remote control commands using a network communicating using a respective protocol; and a universal serial bus (USB) interface configured to receive program updates for said processor and send streaming video and audio data to a storage device communicatively coupled to said the USB interface.

2. The system in accordance with claim 1 further comprising a joystick control module that is interchangeable with a keyboard control module.

3. The system in accordance with claim 1 further comprising a joystick control module wherein said joystick control module is configured to control said plurality of surveillance sensors in a first mode and to navigate a menu in a second mode.

4. The system in accordance with claim 1 wherein said joystick module and said keyboard module comprise a plug and play hot swappable connection to said keypad controller.

5. The system in accordance with claim 1 wherein said processor is configured to determine a codec dependent start code by parsing the codec independent video streams and to select a decoder based on the determined start code.

6. The system in accordance with claim 1 further comprising a display module comprising a visual display, monitor configured to display at least one of images, real-time video sequences, stored video sequences, and a menu for setting system parameters, said display module further comprising a jog/shuttle control configured to control playback of video image streams in a first mode and to navigate a menu displayed on said monitor in a second mode.

7. The system in accordance with claim 1 wherein said network bus comprises a first network bus configured to communicate using at least one of RS232, RS485, and RS422 protocols, and wherein said network further comprises an IP Pass-through module coupled to said keypad controller through a second network bus configured to communicate using at least one of an Ethernet and an Internet protocol, said IP Pass-through module is configured to:

receive a network data packet including a serial bus control message and a destination address for a device to be controlled from the second network bus;

decode the network data packet; and transmit the serial bus message to the destination address on the first network bus.

8. The system in accordance with claim 7 wherein said IP pass-through module is configured to:

receive a serial bus control message and address from a device communicatively coupled to the first network bus;

encode the serial bus message into a second network bus data packet; and transmit the second network bus data packet using the second network bus.

9. The system in accordance with claim 1 wherein said plurality of interchangeable control modules are coupled to said keypad controller using at least one of an infrared connection, a wireless short-range radio frequency personal area network (PAN), and a USB connection.

10. The system in accordance with claim 1 wherein said plurality of interchangeable control modules are coupled to said keypad controller using a wired electrical connection.

11. A computer-implemented method of operating a video surveillance system that includes a keypad controller comprising a video processor, said method comprising:

receiving analog video signals from a video surveillance sensor;

encoding the received analog video signals into a digital format video to be used by the video processor;

receiving codec independent digital format video signals from a network configured to communicate using at least one of Ethernet and Internet protocol;

identifying an I-frame in the video signals;

identifying a codec dependent component in the digital format video signals beginning with the I-frame;

decoding the digital format video signals by the video processor using the codec dependent component of the digital format video signals; and processing the digital format video signals by the video processor;

wherein the keypad controller further comprises:

a housing that includes a plurality of apertures, wherein each aperture of the plurality of apertures forms a geometric shape, wherein the geometric shape is unrelated to electrical coupling with the keypad controller;

a plurality of removable and interchangeable control modules that when mated are electrically coupled to the keypad controller, each of the control modules having a geometric shape configured to physically mate with a geometrically complementary aperture of the plurality of apertures of the keypad controller.

12. The method in accordance with claim 11 wherein processing the digital format video signals by the video processor comprises at least one of real-time-image capture processing, compression and decompression, color space conversion and real-time display, and data packetization for data communication over the network.

13. The method in accordance with claim 11 wherein said keypad controller further comprises a display module including a display screen and wherein receiving video signals comprises receiving a plurality of video streams substantially simultaneously and display at least a portion of the plurality of video streams simultaneously on the display screen.

14. The method in accordance with claim 13 further comprising:

selecting one of the plurality of video streams as a primary video stream;

displaying the primary video stream on the display screen; and displaying at least a portion of the remaining video streams subordinated, to the primary video stream.

15. The method in accordance with claim 13 further comprising displaying at least a portion of the remaining video streams in at least one of a sidebar of the display screen and a running strip along an edge of the display screen.

16. The method in accordance with claim 13 further comprising selecting the plurality of video streams for display based on at least one of a proximity of the cameras generating the video streams to a common location or, path through an area, a logical selection based on a user input or a predetermined selection, and on an evaluation of the amount of activity in each video stream.

17. The method in accordance with claim 13 further comprising defining the selection of the plurality of video streams for display in a macro entered into the keypad controller.

18. The method in accordance with claim 11 wherein decoding the digital format video signals comprises:
   receiving a codec independent video stream from the network;
   parsing the video stream for codec dependent start code;
   identifying the type of compression used in the incoming stream; and
   selecting a decoder based on the identified type of compression.

19. The method in accordance with claim 18 wherein receiving a codec independent video stream comprises receiving the codec independent, video stream from at least one of a digital video recorder (DVR), a video streaming device, a video camera through a video encoder, and an IP camera.

20. The method in accordance with claim 11 further comprising:
   selecting a camera nomenclature aliasing menu using the keypad controller;
   selecting an identifier for a camera on the menu using at least one of a softkey associated with the selection, a joystick, and a jog/shuttle control; and
   selecting a plurality of textual location parameters associated with a corresponding physical location of the camera from the menu using the at least one of a softkey associated with the selection, a joystick, and a jog/shuttle control.

21. The method in accordance With claim 20 wherein selecting a plurality of textual location parameters comprises selecting a textual location parameter from a hierarchical menu of possible textual location parameters in turn through the menu.

* * * * *